United States Patent

Chen

Patent Number: 5,992,283
Date of Patent: Nov. 30, 1999

[54] SAW BLADE MOUNTING STRUCTURE FOR CURVE SAWING MACHINES THAT ALLOWS BUFFER PLAY

[76] Inventor: Ruey-Zon Chen, No. 261 Jen Hua Rd., Ta Li City, Taichung Hsien, Taiwan

[21] Appl. No.: 09/109,928

[22] Filed: Jul. 2, 1998

[51] Int. Cl.⁶ .................................................. B27B 19/02
[52] U.S. Cl. ............................. 83/662; 83/783; 83/581.1
[58] Field of Search .............................. 83/662, 783, 784, 83/785, 786, 581.1, 616, 698.11

[56] References Cited

U.S. PATENT DOCUMENTS

| | | | |
|---|---|---|---|
| 1,968,021 | 7/1934 | Bettendorf | 83/662 |
| 4,455,909 | 6/1984 | Wilbs | 83/662 |
| 5,694,825 | 12/1997 | Chang | 83/783 |

FOREIGN PATENT DOCUMENTS

| | | | |
|---|---|---|---|
| 6748 | 8/1879 | Germany | 83/786 |
| 2656961 | 6/1978 | Germany | 83/783 |

*Primary Examiner*—Rinaldi I. Rada
*Assistant Examiner*—Omar Flores-Sanchez
*Attorney, Agent, or Firm*—Bacon & Thomas

[57] ABSTRACT

A saw blade mounting structure for curve sawing machines that allows buffer play, includes upper and lower saw blade clamps oppositely arranged in a mirror image at front ends of upper and lower support arms adapted to position both pin type and plain type saw blades. an adjusting seat having a post on an upper side for receiving a compression spring therein and a lower side connected to the upper saw blade clamp. The adjusting seat and compression spring are placed in a recess at the front end of the upper support arms with a threaded section of a rotary shaft passing through an upper portion of the recess to lock into a threaded through hole of the adjusting seat to a certain depth, which is adjustable. The rotary shaft has a portion exposed on the outside and connected to a detachable eccentric locking knob. When mounting a saw blade, the locking knob may be turned to exert an eccentric force on the adjusting seat so that the latter elevates to pull the saw blade tight in an optimum position. Replacement of the saw blade is also very easy. When the saw blade hits against a knob in the wood, the compression spring provides sufficient buffer play to avoid breaking of the saw blade. There is also enough play for the upper and lower saw blade clamps to ensure that the saw blade is always in an optimum vertical position with respect to the work table, thus enhancing sawing precision.

2 Claims, 4 Drawing Sheets

SAW BLADE MOUNTING STRUCTURE FOR CURVE SAWING MACHINES THAT ALLOWS BUFFER PLAY

BACKGROUND OF THE INVENTION (a) Field of the Invention

The present invention relates generally to a saw blade mounting structure, and more particularly to a saw blade mounting structure for curve sawing machines that allows buffer play to ensure sawing precision and, avoid breaking of the saw blade, and that facilitates the replacement of both pin type and plain type saw blades.

(b) Description of the Prior Art

Table top curve sawing machines are generally used to obtain small wood boards of various shapes and profiles, because their saw blades are elongated and can cut out different geometrical patterns or wooden cast molds for industrial use when properly operated.

There are generally two types of saw blades with curve sawing machines and their mounting methods are different. One is the plain type. By utilizing grooves of clamp blocks between upper and lower arms of the sawing machine in combination with bolts, the grooves are caused to become narrow so as to tighten and lock the saw blade in position. In the other type, the saw blade has cross pin portions at upper and lower ends thereof, and the clamp blocks are provided with both longitudinal and transverse grooves for receiving the cross pin portions. As there are two types of saw blades, purchasers have to take care not to buy the wrong type since existing curve sawing machines are not adapted to be used with both types of saw blades, which is a major disadvantage with the prior art.

Furthermore, since the saw blade is mounted rigidly between the upper and lower arms of the sawing machine, when it hits against a knot in the wood, it may easily break. Besides, since the upper and lower arms of the sawing machine are actually swinging when the sawing machine is actuated, the saw blade is not operating in a substantially vertical direction so that the saw cuts are not consistent and the sawing precision is affected.

SUMMARY OF THE INVENTION

A primary object of the present invention is to provide a saw blade mounting structure for curve sawing machines that allows buffer play to ensure sawing precision and, avoid breaking of the saw blade, and that facilitates the replacement of both pin type and plain type saw blades.

According to the present invention, the structure comprises upper and lower saw blade clamps opposedly arranged in a mirror image at front ends of upper and lower support arms adapted to position both pin type and plain type saw blades, an adjusting seat having a post on an upper side for receiving a compression spring therein and a lower side connected to the upper saw blade clamp. The adjusting seat and compression spring are placed in a recess at the front end of the upper support arm with a threaded section of a rotary shaft passing through an upper portion of the recess to lock into a threaded through hole of the adjusting seat to a certain depth which is adjustable. The rotary shaft has a portion exposed on the outside and connected to a detachable eccentric locking knob. When mounting a saw blade, the locking knob may be turned to exert an eccentric force on the adjusting seat so that the latter elevates to pull the saw blade tight in an optimum position. Replacement of the saw blade is also very easy. When the saw blade hits against a knob in the wood, the compression spring provides sufficient buffer play to avoid breaking of the saw blade. There is also enough play for the upper and lower saw blade clamps to ensure that the saw blade is always in an optimum vertical position with respect to the worktable, thus enhancing sawing precision.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
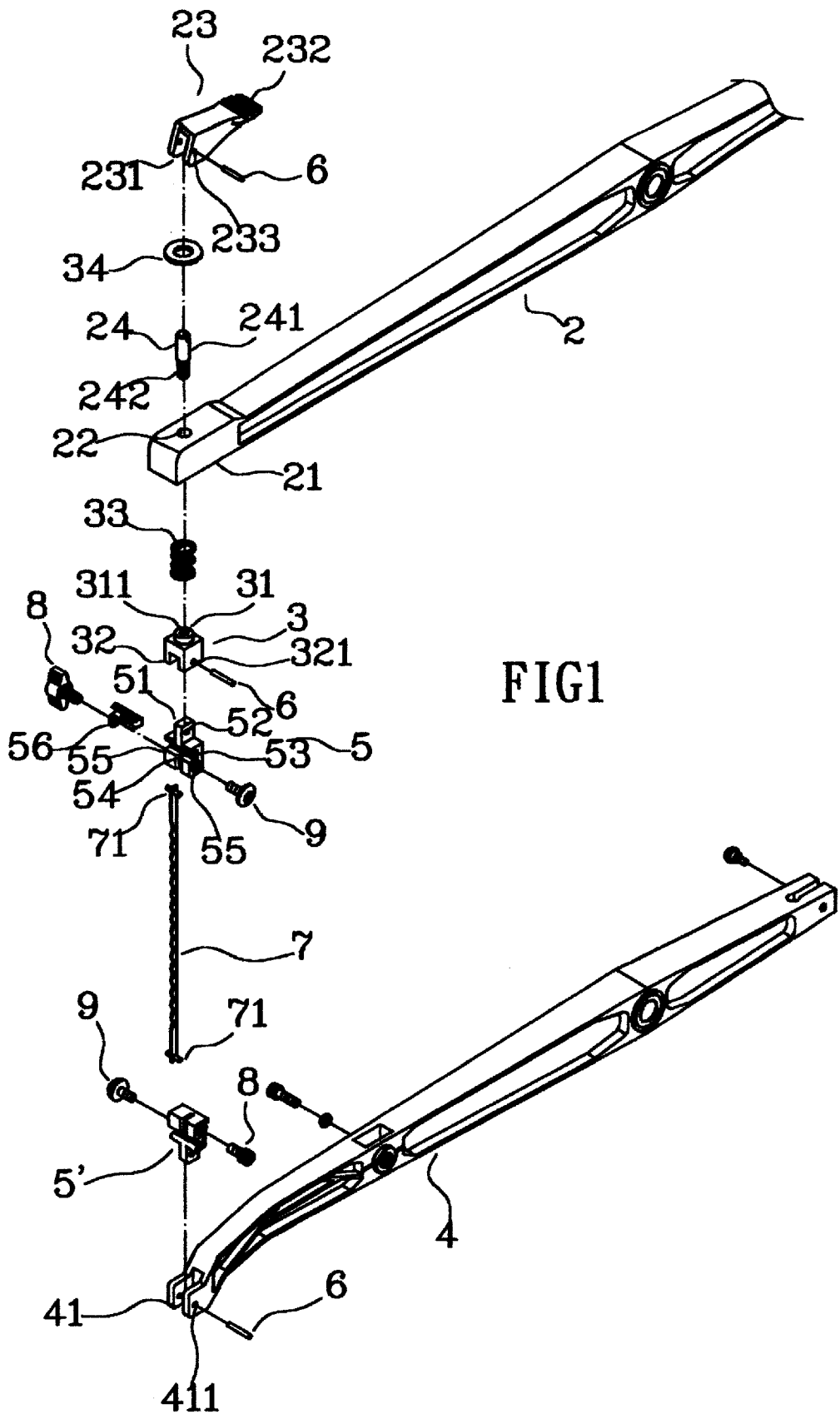
FIG. 1 is a perspective exploded view of the present invention.
Figure 4:
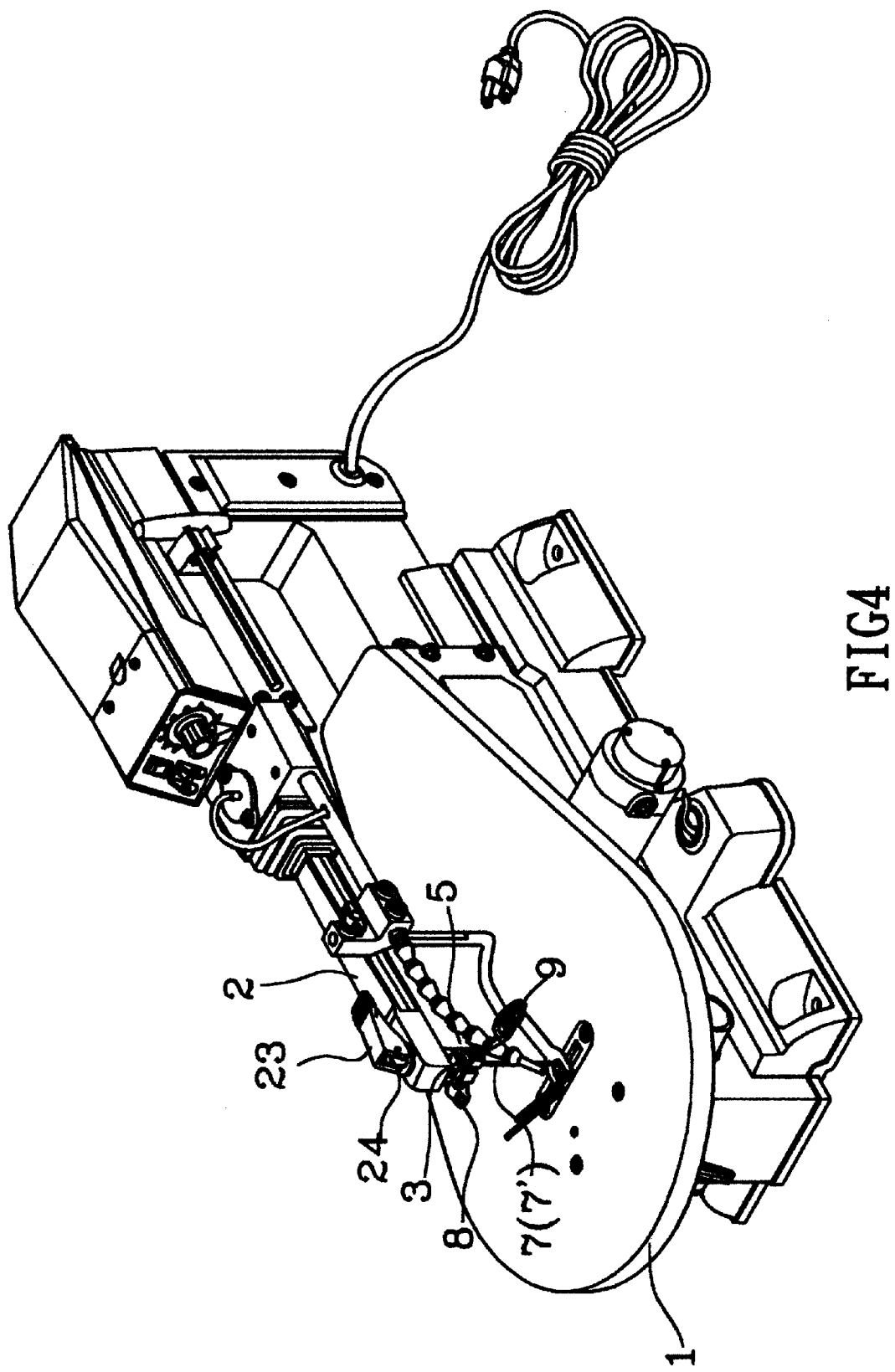
FIG. 4 illustrates operation of the present invention.

With reference to FIGS. 1 and 4, the present invention essentially comprises an upper support arm 2, an adjusting seat 3, a lower support arm 4, and upper and lower clamps 5, 5'.

The upper support arm is provided with a recess 21 at the bottom side of its front end. An enclosed upper side of the recess 21 is formed with a through hole 22. There is provided a locking knob 23 having a front end configured to form an inverted U-shaped portion 231 and a rear end forming a holding portion 232. Symmetrical arms of the U-shaped portion are provided with respective first spring pin holes 233 to accommodate a first spring pin 6 and which are designed to be eccentric with respect to the bottom edge of the inverted U-shaped portion 231. There is further provided a rotary shaft 24 having a smooth section at an upper end which is provided with a second spring pin hole 241 and a threaded section 242 at a lower end.

The adjusting seat 3 includes a circular post 31 at an upper end and an inverted U-shaped block 32 at a lower end. Side walls of the U-shaped block 32 are provided with opposed third spring pin holes 321. The post 31 is centrally provided with a threaded through hole 311.

The lower support arm 4 is provided with a substantially U-shaped opening 41 at its front end. Opposite walls of the opening 41 are provided with fourth spring pin holes 411 respectively.

Upper and lower saw blade clamps 5, 5' each have a narrower section and a wider section. The narrower section is configured to be a T-shaped head 51 provided with a fifth spring pin hole 52. The wider section is configured to have a transverse through groove 53 and a longitudinal groove 54. Opposed threaded through holes 55 are further provided in a lateral side of the wider section and communicate with the longitudinal groove 54. Two pin adapter plates 56 in a matching configuration are respectively fitted in between the transverse groove 53 and the longitudinal groove 54 when it is desired to mount a pin-type saw blade rather than a plain type saw blade, as will be described in more detail below.

During assembly, the T-shaped head 51 of the upper saw blade clamp 5 is inserted into the inverted U-shaped block 32 of the adjusting seat 3, with a second spring pin 6' passing through third and fifth spring pin holes 321 and 52 to be positioned therein. Then the T-shaped head 51 of the lower saw blade clamp 5' is inserted into the U-shaped opening 41 of the lower support arm 4 with a third spring pin 6 passing through fourth and fifth spring holes 411 and 52 respectively to be positioned therein. As shown in the drawings, the upper and lower saw blade clamps 5, 5' are assembled end to end in a mirror image. After assembly, there is enough play between the upper and lower saw blade clamps 5, 5'.

A compression spring 33 is planted into the post 31 at the upper side of the adjusting seat 3 and spring 33 and post 31 are together placed in the recess 21 of the upper support arm 2. The threaded section 242 of the rotary shaft 24 is passed through the through hole 22 at the upper side of the recess 21 through the bore of the compression spring 33 into the threaded through hole 311 of the adjusting seat 3 to a certain depth, which is adjustable as desired. A washer 34 is fitted onto that portion of the rotary shaft 24 exposed on the upper support arm 2, with the inverted U-shaped portion 231 of the locking knob 23 straddling the exposed portion of the rotary shaft 24. The first spring pin 6 passes through the spring pin holes 233 and 241 of the locking knob 23 and rotary shaft 24 respectively for positioning purposes.

Figure 2:
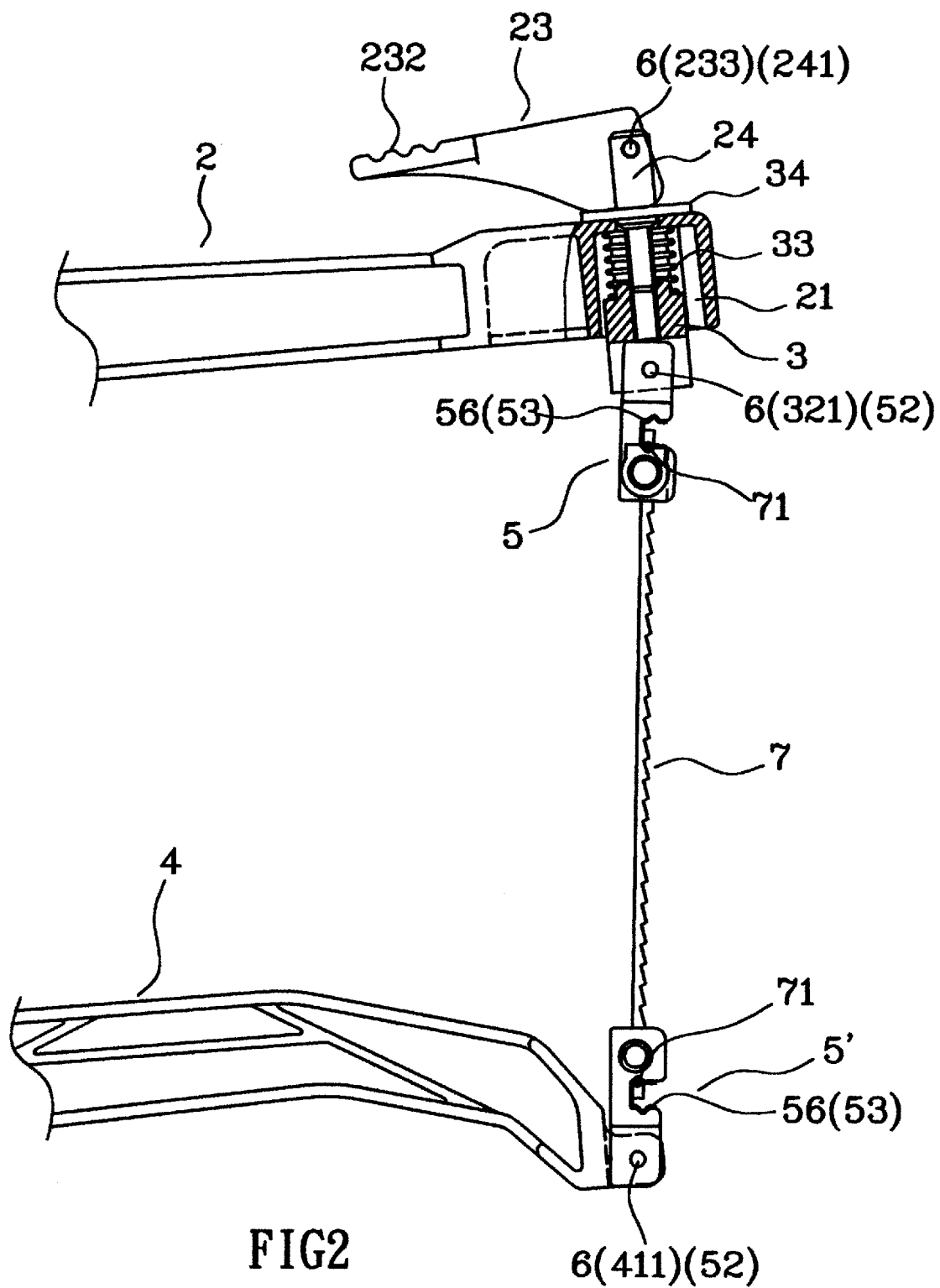
FIG. 2 is a sectional assembled view of the present invention.
Figure 3:
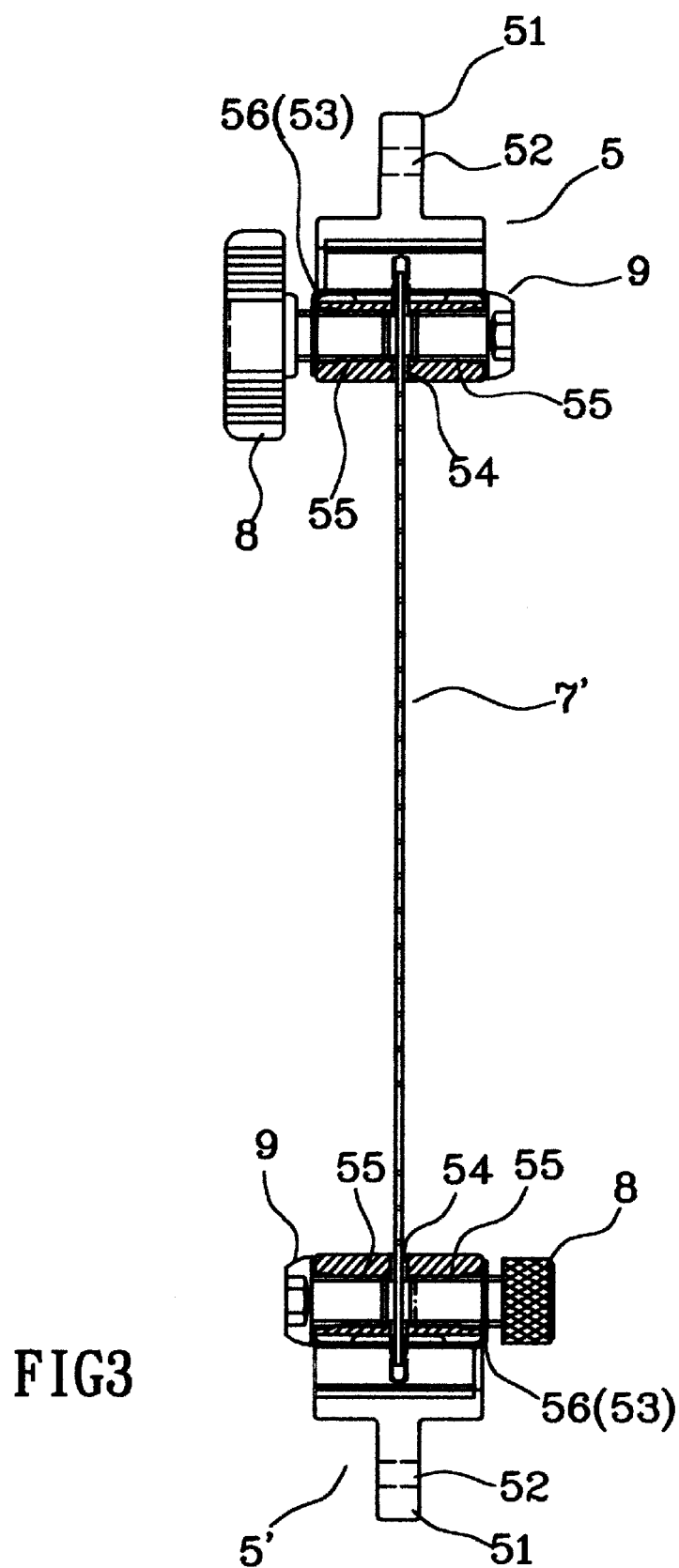
FIG. 3 shows another preferred embodiment of the present invention.

When it is desired to mount a pin type saw blade 7 having upper and lower cross end portions 71, the cross end portions 71 are respectively fitted into the transverse grooves 53 and longitudinal grooves 54 of the upper and lower saw blade clamps 5, 5' respectively, and held by the pin adapter 56. By turning the holding portion 232 of the locking knob 23 to a first position the bottom edge of the locking knob being in sliding engagement with the upper side of the support arm, an eccentric pressure will be exerted on the adjusting seat 3 so that it elevates to thereby pull the saw blade 7 taut (as shown in FIG. 2). If necessary, the locking knob 23 may be pulled reversely to a second position to release the pressure to allow adjustment of the depth of the rotary shaft 24 so that the saw blade 7 may be mounted at an optimum position. Furthermore, during the process of sawing, if the saw blade 7 hits against a knot hidden in the wood, the compression spring 33 will allow buffer play to avoid breaking of the saw blade 7. In addition, since the upper and lower saw blade clamps 5, 5' have enough play during sawing, the saw blade 7 may be kept in an optimum vertical state with respect to the work table 1 (workpiece) regardless of whether the upper and lower support arms 2, 4 are performing a rowing motion. Therefore, when the saw blade 7 is working on a relatively thick piece of wood, the saw cut on the upper and lower surfaces of the wood will be consistent, thus enhancing sawing precision.

Furthermore, with reference to FIG. 4, when mounting a plain type saw blade 7', upper and lower end portions thereof are respectively inserted into the longitudinal grooves 54 of the upper and lower saw blade clamps 5, 5' directly. Tightening knobs 8,8' and securing bolts 9,9' are passed into the corresponding threaded through holes 55 at the lateral side of the upper and lower saw blade clamps 5, 5' to lock the upper and lower end portions of the plain type saw blade 7'. By turning the holding portion 232 of the locking knob 23 to exert an eccentric pressure to cause the adjusting seat 3 to elevate, the plain type saw blade 7' can be pulled tight and positioned. The pressure on the locking knob 23 may be released to allow adjustment of the depth of the rotary shaft 24 to lock the plain type saw blade 7' at an optimum position and then exert an eccentric pressure on and thereby position the locking knob 23. Likewise, during the process of sawing, if the plain type saw blade 7' hits against a knot hidden in the wood, the compression spring 33 will allow buffer play to avoid breaking of the saw blade 7'. In addition, since the upper and lower saw blade clamps 5, 5' have enough play during sawing, the saw blade 7 may be kept in an optimum vertical state with respect to the work table 1 (workpiece) regardless of whether the upper and lower support arms 2, 4 are not truly moving or linking-up in a vertical manner. Therefore, when the saw blade 7' is working on a relatively thick piece of wood, the saw cut on the upper and lower surfaces of the wood will be consistent, thus enhancing sawing precision.

Although the present invention has been illustrated and described with reference to the preferred embodiment thereof, it should be understood that it is in no way limited to the details of such embodiment but is capable of numerous modifications within the scope of the appended claims.

What is claimed is:

1. A saw blade mounting structure for curve sawing machines that allows buffer play, comprising an upper support arm, an adjusting seat, a lower support arm, and upper and lower clamps, said upper support arm being provided with a recess at a bottom side of a front end thereof, an enclosed upper side of the recess being formed with a through hole, a locking knob being provided on the front end of said upper support arm, said locking knob having a front end configured to form an inverted U-shaped portion and a rear end forming a holding portion, symmetrical arms of said U-shaped portion being provided with respective first spring pin holes, said upper support arm further having a rotary shaft having a smooth section at an upper end which is provided with a second spring pin hole and a threaded section at a lower end, said locking knob being connected to said rotary shaft by a first spring pin that passes through said first and second spring pin holes and including a bottom edge in sliding engagement with an upper side of the upper support arm, said first spring pin holes and said bottom edge of the locking knob being arranged such that when said locking knob is pressed, the bottom edge slides relative to the upper support arm, causing the locking knob to rotate and exerts an eccentric pressure on a first spring pin passing through said first and second spring pin, said adjusting seat including a circular post at an upper end and an inverted U-shaped block at a lower end, side walls of said U-shaped block being provided with opposed third spring pin holes, said post being centrally provided with a threaded through hole, said lower support arm being provided with a substantially U-shaped opening at a front end thereof, opposite walls of said opening being provided with fourth spring pin holes respectively, upper and lower saw blade clamps each having a narrower section and a wider section, said narrower section being configured to have a T-shaped head with a fifth spring pin hole, said wider section being configured to have a transverse through groove and a longitudinal groove, opposed threaded through holes being further provided in a lateral side of the wider section in communication with said longitudinal groove, two matching pin adapter plates being respectively fitted in between said transverse groove and said longitudinal groove;

wherein said T-shaped head of said upper saw blade clamp is arranged to be inserted into said inverted U-shaped block of said adjusting seat, with said first spring pin passing through said third and fifth spring pin holes and to be positioned therein, and said T-shaped head of said lower saw blade clamp is arranged to be inserted into said U-shaped opening of said lower support arm with a second spring pin passing through said fourth and fifth spring holes respectively to be positioned therein, said upper and lower saw blade clamps being assembled end to end in a mirror image; a compression spring being planted into said post at the upper side of said adjusting seat and being together placed in said recess of said upper support arm, said threaded section of said rotary shaft being passed through said through hole at the upper side of said recess through a bore of said compression spring into said threaded through hole of said adjusting seat to a certain depth, and said inverted U-shaped portion of said locking knob straddling the exposed portion of said rotary shaft, with a third spring pin passing through said spring pin holes of said locking knob and said rotary shaft respectively for positioning purposes; and wherein said pin adapter plates are arranged to be positioned in said transverse groove of said upper and lower saw blade clamps upon mounting of a pin type saw blade having upper and lower cross end portions, said cross end portions being respectively fitted into said transverse grooves and said longitudinal grooves of said upper and lower saw blade clamps respectively, said locking knob being arranged such that when said locking knob is turned to a first position, said eccentric pressure will be exerted on said adjusting seat so that it elevates to thereby pull said saw blade taut, said compression spring allowing buffer play to avoid breaking of said saw blade, and said upper and lower saw blade clamps providing enough play during sawing so that said saw blade may be kept in an optimum vertical state with respect to a workpiece, thereby enhancing sawing precision.

2. A saw blade mounting structure for curve sawing machines that allows buffer play as defined in claim 1, wherein said longitudinal grooves of said upper and lower saw blade clamps are arranged to receive end portions of a plain type saw blade directly without insertion of said pin adapter plates, and tightening knobs and securing blots being passed into the corresponding threaded through holes at a lateral side of said upper and lower saw blade clamps to lock said upper and lower end portions of said plain type saw blade, by turning said holding portions of said locking knob to exert said eccentric pressure to cause said adjusting seat to elevate and said plain type saw blade to be pulled tight and positioned, thereby ensuring enhancing sawing precision and avoiding breaking of said saw blade.

* * * * *